US011338798B2

(12) United States Patent
Pan et al.

(10) Patent No.: US 11,338,798 B2
(45) Date of Patent: May 24, 2022

(54) FULL-AUTOMATIC PARKING METHOD AND SYSTEM

(71) Applicant: Guangzhou Automobile Group Co., Ltd., Guangdong (CN)

(72) Inventors: Qinggui Pan, Guangdong (CN); Qiaojun He, Guangdong (CN); Ming Fan, Guangdong (CN); Xiaomin Lin, Guangdong (CN); Mingzhe Qiu, Guangdong (CN); Zhifeng Liu, Guangdong (CN)

(73) Assignee: GUANGZHOU AUTOMOBILE GROUP CO., LTD., Guangzhou (CN)

(*) Notice: Subject to any disclaimer, the term of this patent is extended or adjusted under 35 U.S.C. 154(b) by 233 days.

(21) Appl. No.: 16/321,048

(22) PCT Filed: Aug. 3, 2018

(86) PCT No.: PCT/CN2018/098539
§ 371 (c)(1),
(2) Date: Jan. 28, 2019

(87) PCT Pub. No.: WO2019/056872
PCT Pub. Date: Mar. 28, 2019

(65) Prior Publication Data
US 2021/0354686 A1 Nov. 18, 2021

(30) Foreign Application Priority Data
Sep. 19, 2017 (CN) .......................... 201710848071.0

(51) Int. Cl.
B60W 30/06 (2006.01)
H04W 4/40 (2018.01)
(Continued)

(52) U.S. Cl.
CPC ............ B60W 30/06 (2013.01); B60W 10/20 (2013.01); B60W 30/09 (2013.01);
(Continued)

(58) Field of Classification Search
CPC .. B60W 30/06; B60W 60/0011; B60W 10/20; B60W 30/09; B60W 30/143;
(Continued)

(56) References Cited

U.S. PATENT DOCUMENTS

2011/0057814 A1* 3/2011 Park .................... B62D 15/0285
340/932.2
2015/0197254 A1* 7/2015 Wysietzki ............. B60W 40/10
701/41
(Continued)

FOREIGN PATENT DOCUMENTS

CN 102069799 A 5/2011
CN 103241239 A 8/2013
(Continued)

Primary Examiner — Kerri L Mcnally
(74) Attorney, Agent, or Firm — ScienBiziP, P.C.

(57) ABSTRACT

Provided are a full-automatic parking method and system. The full-automatic parking method comprises: receiving a start instruction sent by a user, and activating an automatic parking system according to the start instruction; controlling a vehicle to automatically move forward and search, during moving, whether there is an available parking space at the left side or the right side of the vehicle, and when there is an available parking space, identifying basic information of the target parking space; planning a parking path according to the identified basic information of the target parking space, and obtaining a start point of parking and a parking path from the start point of parking to an end point of parking; controlling the vehicle to automatically move to the start point of parking; and controlling the vehicle to automatically park in the parking space according to the planned parking path. Through the full-automatic parking method and system (Continued)

provided by the present disclosure, a vehicle searches and identifies a free parking space while automatically moving forward, and automatically parks in the parking space; no human involvement is required in the whole process of searching a parking space and parking, thereby implementing full-automatic parking.

20 Claims, 7 Drawing Sheets

(51) Int. Cl.
    *B60W 60/00*     (2020.01)
    *B60W 10/20*     (2006.01)
    *B60W 30/09*     (2012.01)
    *B60W 30/14*     (2006.01)
    *G01S 15/08*     (2006.01)
    *G01S 15/931*     (2020.01)
    *G05D 1/00*     (2006.01)
    *G08G 1/14*     (2006.01)

(52) U.S. Cl.
    CPC ...... *B60W 30/143* (2013.01); *B60W 60/0011* (2020.02); *G01S 15/08* (2013.01); *G01S 15/931* (2013.01); *G05D 1/0022* (2013.01); *G08G 1/14* (2013.01); *H04W 4/40* (2018.02); *B60W 2710/207* (2013.01); *G01S 2015/934* (2013.01); *G05D 2201/0213* (2013.01)

(58) Field of Classification Search
    CPC ....... H04W 4/40; G01S 15/08; G05D 1/0022; G08G 1/14
    USPC ...................................................... 340/932.2
    See application file for complete search history.

(56) References Cited

U.S. PATENT DOCUMENTS

| | | | |
|---|---|---|---|
| 2016/0189435 A1* | 6/2016 | Beaurepaire | G06Q 30/0208 705/13 |
| 2017/0253237 A1 | 9/2017 | Diessner | |

FOREIGN PATENT DOCUMENTS

| | | | |
|---|---|---|---|
| CN | 104260722 A | | 1/2015 |
| CN | 104691544 A | * | 6/2015 |
| CN | 104691544 A | | 6/2015 |
| CN | 105774655 A | | 7/2016 |
| CN | 106043282 A | | 10/2016 |
| CN | 106671976 A | | 5/2017 |
| CN | 106985815 A | | 7/2017 |
| CN | 106985908 A | | 7/2017 |
| CN | 107776570 A | | 3/2018 |
| KR | 20170025206 A | | 3/2017 |
| WO | 2017154787 A1 | | 9/2017 |

* cited by examiner

FULL-AUTOMATIC PARKING METHOD AND SYSTEM

TECHNICAL FIELD

The present disclosure relates to the technical field of automobile control, and in particular to a full-automatic parking method and system.

BACKGROUND

In recent years, with the continuous increase of the vehicles, parking has become a big problem, which bothers many vehicle owners. For those drivers who are not skilled, they cannot easily drive the vehicle into a parking space, or even the vehicle is parked into the parking space, but the vehicle scrapings are happened often when open the door, or a vehicle occupies two parking spaces. In order to solve the problem, one method is to build more parking spaces, and another method is to improve the occupancy rate of the existing parking spaces, so if the vehicle can automatically identify a parking space and park, then the problem may be effectively solved.

At present, most parking system supply parking assistance, the driver also needs to manually drive forward the vehicle to search a parking space, determine the type of the parking space, and control the accelerator/brake in the vehicle during parking, so the degree of automation is low, and the driving experience is not good. Moreover, because the driver also needs to perform a part of operations in the vehicle during parking, when the vehicle finish parking in a narrow vertical parking space, there is no room for the driver, who completes the parking with the help of the automatic parking system, to open the door to get off.

SUMMARY

In view of this, it is necessary to provide a full-automatic parking method and system, for solving a technical problem that a driver is required to manually drive a vehicle to move forward to search a parking space and determine a type of the parking space, and the driver is also required to perform a part of control actions in the vehicle, which leads to a low degree of automation.

A full-automatic parking method is provided by the embodiments of the present disclosure, and the method includes: a start instruction sent by a user is received, and an automatic parking system is activated according to the start instruction; a vehicle is controlled to automatically move forward and search, during moving, whether there is an available parking space at the left side or the right side of the vehicle, and when there is an available parking space, basic information of a target parking space is identified; a parking path is planned according to the identified basic information of the target parking space, and a start point of parking and a parking path from the start point of parking to an end point of parking are obtained; the vehicle is controlled to automatically move to the start point of parking; the vehicle is controlled to automatically park in the parking space according to the planned parking path.

A full-automatic parking system is provided by the embodiments of the present disclosure, and the system includes: an automatic parking system starting device, a device for detecting whether the driver has got off, a sensing device, an automatic parking control device, a speed control device, a gear control device, a steering wheel control device, and a vehicle disabling device. Any one of the automatic parking system starting device, the device for detecting whether the driver has got off, the sensing device, the speed control device, the gear control device, the steering wheel control device, and the vehicle disabling device is connected with the automatic parking control device.

In the full-automatic parking method and system provided by the embodiments of the present disclosure, after automatic parking is activated, a vehicle searches and identifies a free parking space while automatically moving forward, and automatically parks in the parking space after finding a free parking space. No human involvement is required in the whole process of searching a parking space and parking, the full-automatic parking is implemented by the full-automatic parking system. In this way, the driver can get off before the vehicle parks into the parking space, which avoids a situation where the driver cannot open the door to get off when driving the vehicle to park in a narrow vertical or diagonal parking space, thereby improving user experience.

DETAILED DESCRIPTION OF THE EMBODIMENTS

In order to further elaborate the technical means and efficiency adopted by the present disclosure to achieve a predetermined purpose, the present disclosure is described in detail below in combination with the accompanying drawings and preferred embodiments.

Figure 1:
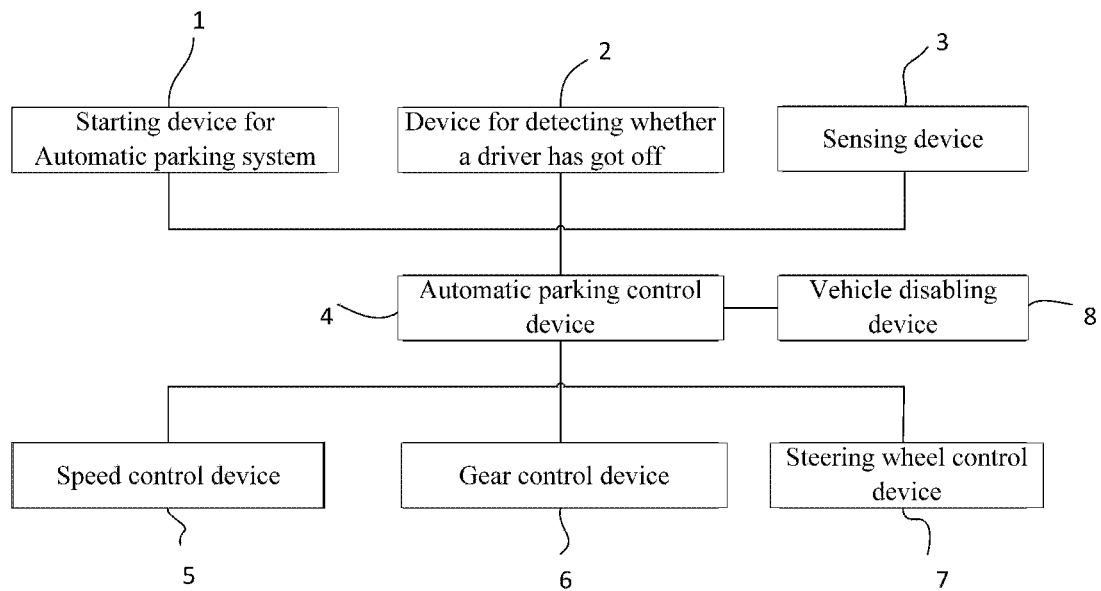
FIG. 1 is a structure diagram of a full-automatic parking system according to an embodiment of the present disclosure.

As illustrated in FIG. 1, embodiments of the present disclosure provide a full-automatic parking system, which includes: an automatic parking system starting device 1, a device for detecting whether a driver has got off 2, a sensing device 3, an automatic parking control device 4, a speed control device 5, a gear control device 6, a steering wheel control device 7, and a vehicle disabling device 8.

Any one of the automatic parking system starting device 1, the device for detecting whether a driver has got off 2, the sensing device 3, the speed control device 5, the gear control device 6, the steering wheel control device 7, and the vehicle disabling device 8 is connected with the automatic parking control device 4, so as to send a detection signal to the automatic parking control device 4 or accept a control from the automatic parking control device 4. The automatic parking control device 4 is a control core of the full-automatic parking system.

In consideration of a requirement for parking time efficiency, the full-automatic parking system of the embodiments of the present disclosure is especially suitable for performing short-distance full-automatic parking, that is, a driver preliminarily confirms that there is a parking space available for parking within a short-distance (for example, 50 m) range directly in front of the vehicle, and then activates the parking system through the automatic parking system starting device 1.

After the parking system is activated, the vehicle starts to move forward to search a parking space, detects, through the sensing device 3, to acquire information about a distance between the current vehicle and surroundings during moving, corrects a steering wheel angle to avoid a collision with an obstacle, senses, during searching, information about a type, position and dimension of the parking space, plans, through the automatic parking control device 4, a parking path after search an available parking space, performs real-time feedback control over the speed control device 5, the gear control device 6, and the steering wheel control device 7 according to the planned parking path, and finally implements a full-automatic parking action.

The operation that the driver preliminarily confirms that there is a parking space available for parking within the short-distance (for example, 50 m) range directly in front of the vehicle, and then activates the parking system through the automatic parking system starting device 1 may avoid a situation where when there is no parking space within a long-distance range directly in front of the vehicle which will takes a long time for the vehicle to move forward to search a parking space, or the vehicle cannot find a parking space due to the obstacle, and finally cannot automatically park.

Figure 2:
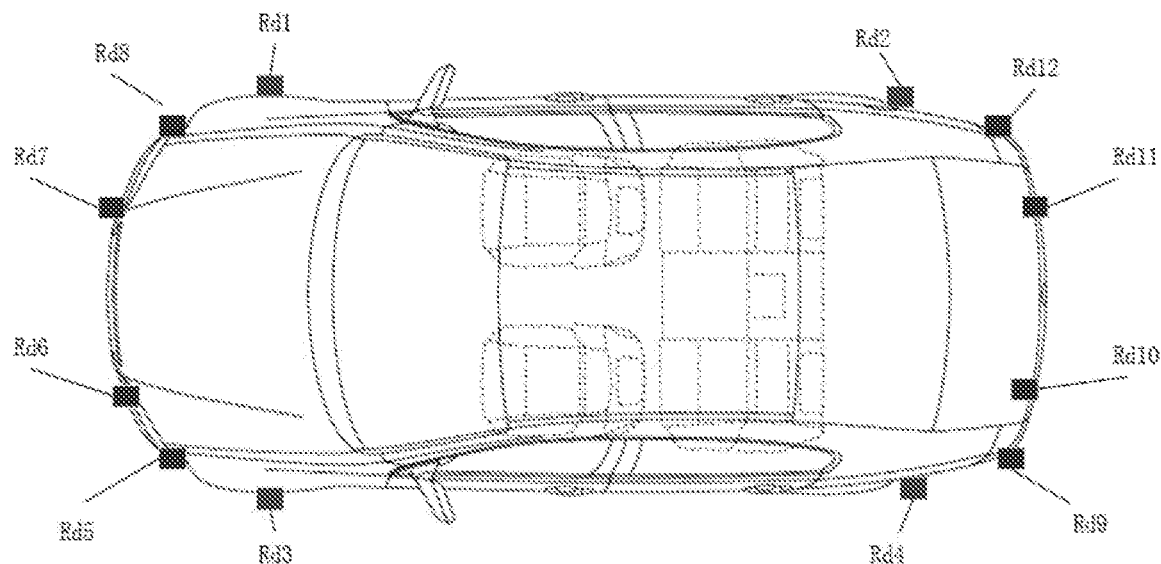
FIG. 2 is a schematic diagram of arrangement of a sensing device on a vehicle.

As illustrated in FIG. 2, the sensing device 3 includes 12 ultrasonic sensors installed around the vehicle body for detecting the obstacle. Four sensors (Rd1-Rd4) are installed on the fenders which are above four hubs of the vehicle, and the rest eight sensors (Rd5-Rd12) are installed on front and rear bumpers of the vehicle. The 12 sensors are around the vehicle to detect a parking space and a distance to the obstacle in the case of three different types of parking space, namely a vertical parking space, a parallel parking space, and a diagonal parking space, thereby avoiding a detection blind zone and finally acquiring accurate and complete environmental information.

An ultrasonic sensors includes a sending unit and a receiving unit. The sending unit periodically sends out an ultrasonic signal, and the ultrasonic signal is reflected back after encountering an obstacle. The reflected signal is received by the ultrasonic sensor receiving unit, and then a distance between the obstacle and the ultrasonic sensor may be calculated according to a time interval difference between sending and receiving and a transmission speed of sonic wave. In this way, no matter the obstacles are at the side of the vehicle or in the rear of the vehicle or in the front of the vehicle, they may be detected in real time. The four ultrasonic sensors at the left side or the right side of the vehicle are separately installed, being parallel to the ground, on the fenders which are above the hubs of the wheels, and has a height above ground of 700 mm. The four ultrasonic sensors on the head of the vehicle are symmetrically arranged taking the center position of the front bumper as the axis of symmetry of axis, are parallel to the ground, and has a height above ground of 500 mm. The four ultrasonic sensors on the back of the vehicle are symmetrically arranged taking the center position of the rear bumper as the axis of symmetry of axis, are parallel to the ground, and has a height above ground of 500 mm. In this way, the sensor may measure a distance efficiently, and a reflection interference from the ground and the comparatively small obstacle on the ground is avoided.

Figure 3:
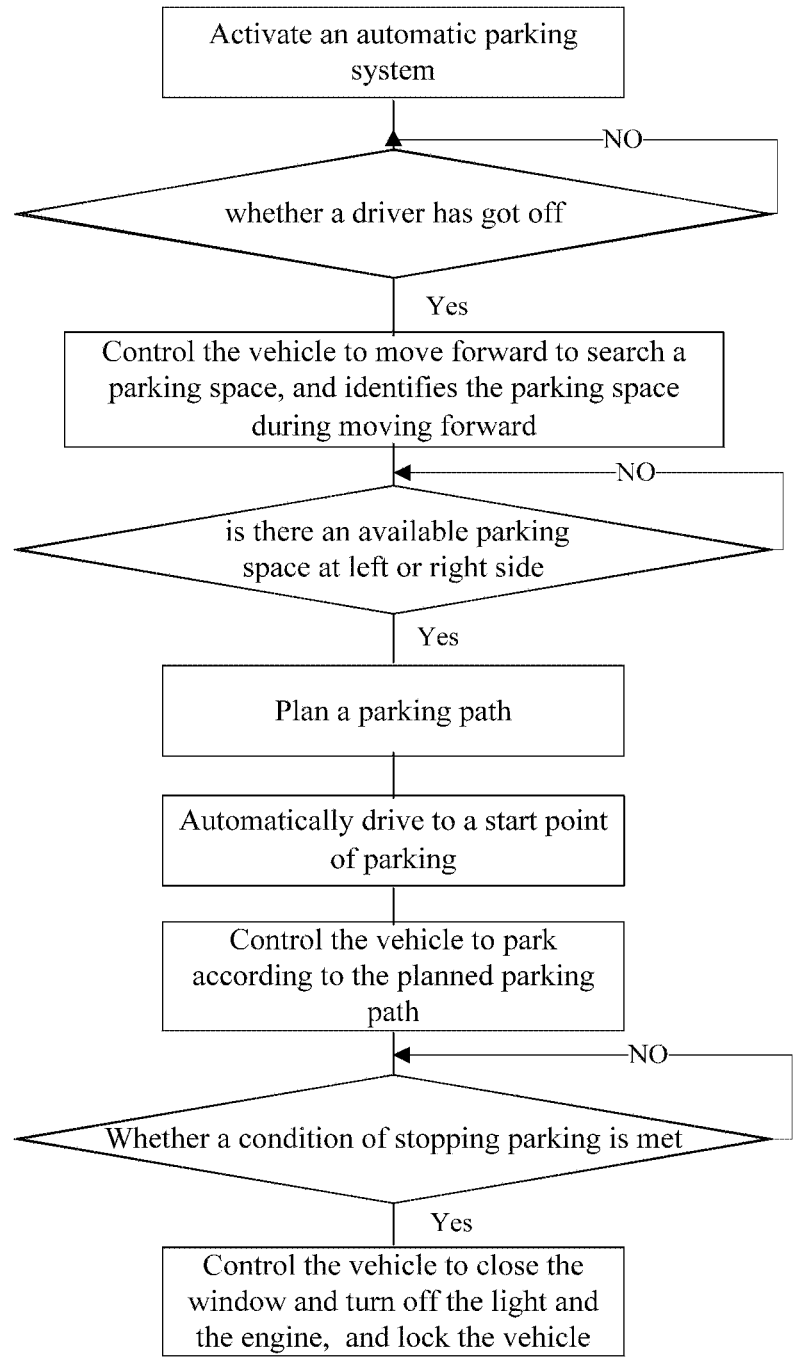
FIG. 3 is a flowchart of a full-automatic parking method according to an embodiment of the present disclosure.

As illustrated in FIG. 3, the embodiments of the present disclosure also provide a full-automatic parking method, which includes the following steps.

At S10, a start instruction sent by a user is received, and an automatic parking system is activated according to the start instruction.

At S20, a vehicle is controlled to automatically move forward and search, during moving, whether there is an available parking space at the left side or the right side of the vehicle, and when there is an available parking space, basic information of a target parking space is identified.

At S30, a parking path is planned according to the identified basic information of the target parking space, and a start point of parking and a parking path from the start point of parking to an end point of parking are obtained.

At S40, the vehicle is controlled to automatically move to the start point of parking.

At S50, the vehicle is controlled to automatically park in the parking space according to the planned parking path.

In one embodiment, an automatic parking button may be set in the vehicle, and when the automatic parking button is triggered by the user, the automatic parking system is activated. At this point, the automatic parking system starting device 1 is the automatic parking button set in the vehicle. The automatic parking button may be either a physical switch or a virtual switch which implements touch input through a touch screen.

Therefore, at S10, the operation that the start instruction sent by the user is received, and the automatic parking system is activated according to the start instruction may further include the following steps.

At S11, it is detected whether the automatic parking button is triggered by the user set in the vehicle.

At S12, when it is detected that the automatic parking button is triggered by the user, the automatic parking system is activated.

In another embodiment, a wireless signal receiving device may be set in the vehicle. When the user sends an automatic parking start instruction to the wireless signal receiving device through a remote key or a user terminal, the automatic parking system is activated. At this point, the automatic parking system starting device 1 is the wireless signal receiving device set in the vehicle, and the remote key or the user terminal. When the remote key is used, the user may press the automatic parking button set on the remote key to enable an automatic parking function. When the user terminal is used, an automatic parking application program (namely APP) may be preinstalled on the user terminal, and the user may enable the automatic parking function only by opening the application program and sending the automatic parking instruction.

Therefore, at S10, the operation that the start instruction sent by the user is received, and the automatic parking system is activated according to the start instruction may further include the following steps.

At S13, it is detected whether the user sends the automatic parking start instruction to the wireless signal receiving device set in the vehicle through the remote key or the user terminal.

At S14, when it is detected that the user sends the automatic parking start instruction to the wireless signal receiving device, the automatic parking system is activated.

The automatic parking button or the wireless signal receiving device is connected with the automatic parking control device 4, and is configured to send an automatic parking activation instruction to the automatic parking control device 4. After receiving the automatic parking activation instruction, the automatic parking control device 4 acquires in real time information about the current speed from a CAN bus or LIN bus of the vehicle, and compares the current speed with a preset speed threshold of the system. If the current speed is lower than the speed threshold, the automatic parking function is enabled; or else, the automatic parking function is not enabled.

Furthermore, the vehicle is equipped with the device for detecting whether a driver has got off 2 to detect whether a driver has got off. In an embodiment, only after the driver gets off, the vehicle is controlled to move forward to search a parking space. Because the parking system of the embodiments can implement full-automatic parking, and the driver may have no need to perform additional operations in the vehicle, the driver may get off before the vehicle parks in the parking space to avoid a situation where the driver cannot open the door to get off when driving the vehicle to park in a narrow vertical or diagonal parking space, thereby improving user experience. Specifically, the device for detecting whether a driver has got off 2 may be, but not limited to a gravity sensor set on a driver's seat, for collecting weight information of the driver. When detecting the weight information of the driver, the gravity sensor determines that the driver has not got off; when not detecting the weight information of the driver, the gravity sensor determines that the driver has got off. The device for detecting whether a driver has got off 2 may also be a camera or other detecting devices.

Therefore, after the automatic parking system is activated, and before the vehicle is controlled to move forward to search a parking space, the full-automatic parking method may further include the following steps.

At S61, it is detected whether the driver has got off.

At S62, if it is detected that the driver has not got off, the vehicle is controlled to be in a stationary state and wait for or prompt the driver to get off.

At S63, if it is detected that the driver has got off, the vehicle is controlled to move forward to search a parking space.

In another embodiment, the driver may also get off before the vehicle automatically parks in the parking space according to the planned parking path at last. In this way, the driver also gets off before the vehicle parks in the parking space, which avoids the situation where the driver cannot open the door to get off when driving the vehicle to park in the narrow vertical or diagonal parking space. Therefore, after the automatic parking system is activated, and before the vehicle is controlled to automatically park according to the planned parking path, the full-automatic parking method may further include the following steps.

At S61, it is detected whether the driver has got off.

At S62, if it is detected that the driver has not got off, the vehicle is controlled to be in the stationary state and wait for or prompt the driver to get off.

At S63, if it is detected that the driver has got off, the vehicle is controlled to automatically park according to the planned parking path.

At S20, the operation that the vehicle is controlled to automatically move forward and search, during moving, whether there is an available parking space at the left side or the right side of the vehicle may further include the following steps.

At S21, the vehicle is controlled to automatically move forward at a given speed.

At S22, during moving, when the sensing device 3 set on the vehicle body is used to acquire distance-measurement information of an ultrasonic sensors about the vehicle and surroundings, and a moving speed and a steering wheel angle of the vehicle are adjusted, according to the distance-measurement information, to make the vehicle search the parking space and avoid the obstacles in a moving direction until it is determined according to the distance-measurement information that there is an available parking space at left or right sides of the vehicle, the basic information of the target parking space is acquired according to the distance-measurement information.

Figure 4:
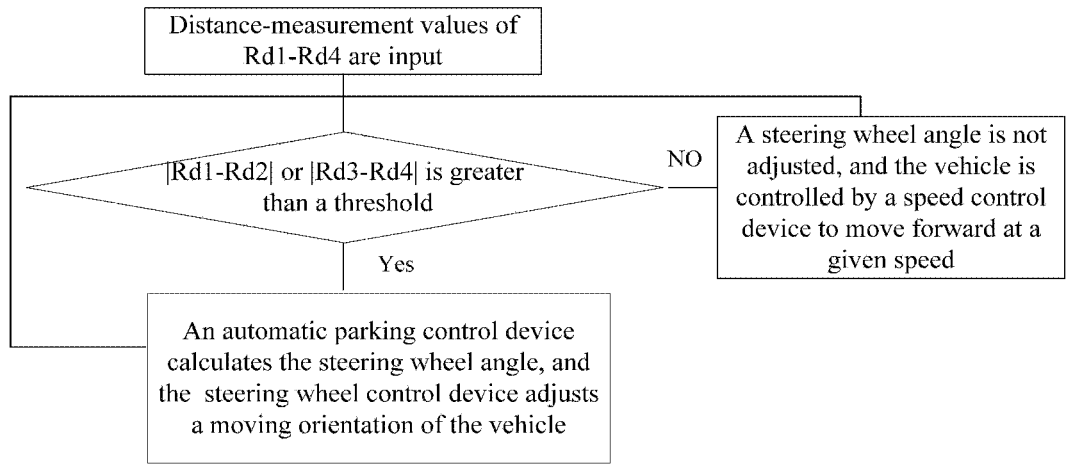
FIG. 4 is a control flow chart of adjusting a posture of the vehicle body when a vehicle moves forward to search a parking space.

Specifically, as illustrated in FIG. 4, when the vehicle searches a parking space in the moving direction, information about the obstacles around the vehicle is detected in real time by the 12 ultrasonic sensors Rd1-Rd12 on the vehicle body, and it is determined, according to the distance-measurement information of the sensors Rd1-Rd4 at left and right sides of the vehicle, whether the vehicle deviates from the moving direction. For example, distance-measurement values of the sensors Rd1-Rd4 at left and right sides are input to the automatic parking control device 4, and the automatic parking control device 4 compares whether |Rd1-Rd2| or |Rd3-Rd4| is greater than a threshold. When a comparison result is yes, it is determined that the vehicle has deviated from the moving direction, the steering wheel angle is calculated by the automatic parking control device 4, and a moving orientation of the vehicle is adjusted through the speed control device 5 and the steering wheel control device 7 until the vehicle returns to the correct moving direction. When the comparison result is no, it is determined that the vehicle has not deviated from the moving direction, and the vehicle may continue moving forward along the current moving direction.

When searching a parking space in the moving direction, the vehicle determines, according to the distance-measurement information of the sensors Rd5-Rd8 directly in front of the vehicle, whether there is the obstacle directly in front of the vehicle. If it is detected, according to the distance-measurement information of the sensors Rd5-Rd8 directly in front of the vehicle, that there is the obstacle directly in front of the vehicle, the vehicle is controlled to brake, and after the front obstacle disappears, the vehicle is controlled to continue to move forward to search a parking space. If the front obstacle is still there after scheduled time, the vehicle is controlled to exit the automatic parking state When moving forward and finds an available parking space, the vehicle acquires basic information of a target parking space according to the distance-measurement information. The basic information of the target parking space includes, for example, a location (whether the target parking space is at the left side or the right side of the vehicle), a type (whether the target parking space is a parallel parking space, a vertical parking space or a diagonal parking space), a dimension (width and depth of the target parking space) and an angle of inclination (included angle between the target parking space and the moving direction of the vehicle) of the target parking space, and a lateral distance between the vehicle and the target parking space. According to the basic information of the target parking space, the automatic parking control device 4 may determine whether the target space is the parking space available for parking.

Figure 5:
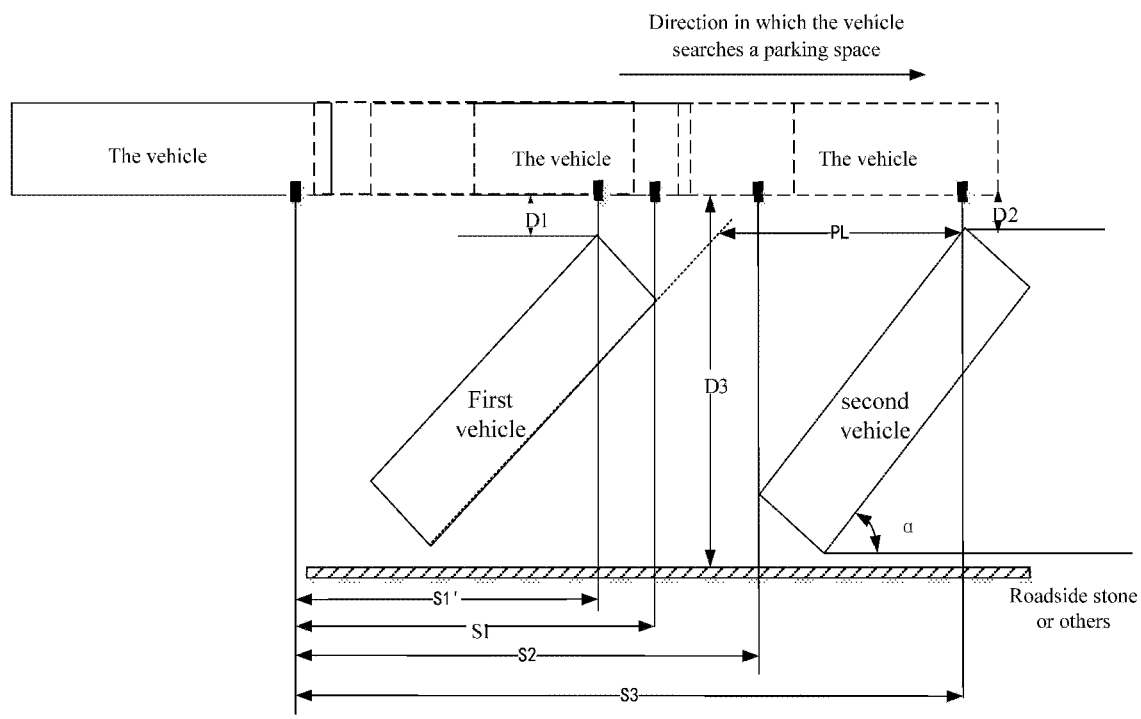
FIG. 5 is a schematic diagram that a vehicle moves forward to search and obtain a diagonal parking space.
Figure 6:
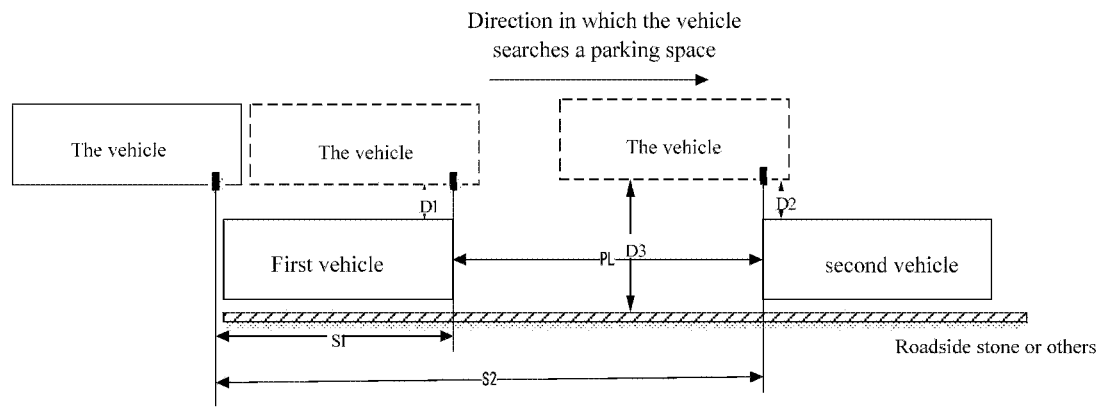
FIG. 6 is a schematic diagram that a vehicle moves forward to search and obtain a vertical or parallel parking space.

How the vehicle determines whether an available parking space is searched is illustrated below. As illustrated in FIG. 5, by taking using the sensors Rd1 and Rd2 at the right side to search whether there is an available parking space at the right side of the vehicle for example, when there is a vehicle or other obstacle at the right side of the vehicle, the distance-measurement values of the sensor at the right side of the vehicle, changing over time, should be a series of values which are within 200 cm and whose fluctuations in a previous distance-measurement value and a later distance-measurement value is within 50 cm, it is determined from this that the vehicle passes by a vehicle/other obstacle at present. When the vehicle is about to leave this vehicle/other obstacle, the distance-measurement value of the sensor at the right side has a step change, at this point, a drive distance S1 of the vehicle is recorded as a first boundary of the parking space, a minimum distance-measurement value D1 of the sensor during the time when the vehicle passes by this vehicle/other obstacle as the lateral distance between the vehicle and the first vehicle/other obstacle, and the drive distance S1' of the vehicle corresponding to the minimum distance-measurement value D1 is recorded. When the vehicle passes by a vehicle/other obstacle again, the distance-measurement value of the ultrasonic sensor has a step change again, at this point, the drive distance S2 of the vehicle is recorded as the second boundary of the parking space, a minimum distance-measurement value D2 during the time when the vehicle passes by the second vehicle/other obstacle is recorded as the lateral distance between the vehicle and the second vehicle/other obstacle, the drive distance S3 of the vehicle corresponding to the minimum distance-measurement value D2 is recorded, and a minimum distance-measurement value of the ultrasonic sensor during the first step change and the second step change is recorded as a parking space depth D3. A change trend of the distance-measurement value of the ultrasonic sensor when the vehicle passes by the first vehicle/obstacle and the second vehicle/obstacle is determined, the distance-measurement values of the ultrasonic sensors are fitted into a straight line changing over time, and then an angle of inclination between the moving direction and the parked vehicle/obstacle when the vehicle passes by the first vehicle/other obstacle and the second vehicle/other obstacle is obtained by calculating the slope of the straight line. If $\alpha \geq 15°$, and $D3 \geq L*\sin \alpha + D2 + 1$ m, and $$\left(S2 - S1 - \frac{S1 - S1'}{(\tan\alpha)^2}\right) * \sin\alpha \geq W + 1 \text{ m},$$

where the L is the length of the vehicle and the W is the width of the vehicle, then it is determined that the target parking space is a diagonal parking space available for parking, and a parking space width $$PL = \left(S2 - S1 - \frac{S1 - S1'}{(\tan\alpha)^2}\right),$$

the lateral distance D2, and the angle of inclination of parking space $\alpha$ are obtained. If $\alpha \leq 15°$, $D3 \geq W + D2$, and $S2 - S1 \geq L + 1.2$ m, it is determined that the target parking space is a parallel parking space available for parking, as illustrated in FIG. 6, the parking space width $PL = S2 - S1$ and the lateral distance D2 are obtained. If $\alpha \leq 15°$, $D3 \geq L + D2$, and $S2 - S1 \geq W + 1$ m, it is determined that the target parking space is a vertical parking space available for parking, and the parking space width $PL = S2 - S1$ and the lateral distance D2 are obtained. if none of the above conditions is met, it is determined that the current found parking space is not a parking space available for parking, and the vehicle continues to move forward to search a parking space.

The process of using the ultrasonic sensors Rd3 and Rd4 at the left side to search whether there is an available parking space at the left side of the vehicle is similar to the above situation, and the only difference is using the distance-measurement values of the ultrasonic sensors Rd3 and Rd4 at the left side to determine, which will not be repeated here.

At S30, the operation that the parking path is planned according to the identified basic information of the target parking space, and a start point of parking and a parking path from the start point of parking to an end point of parking are obtained specifically includes that the automatic parking control device 4 calculates based on a simplified model of Ackermann steering geometry to obtain the start point of parking and the parking path from the start point of parking to the end point of parking.

Figure 7:
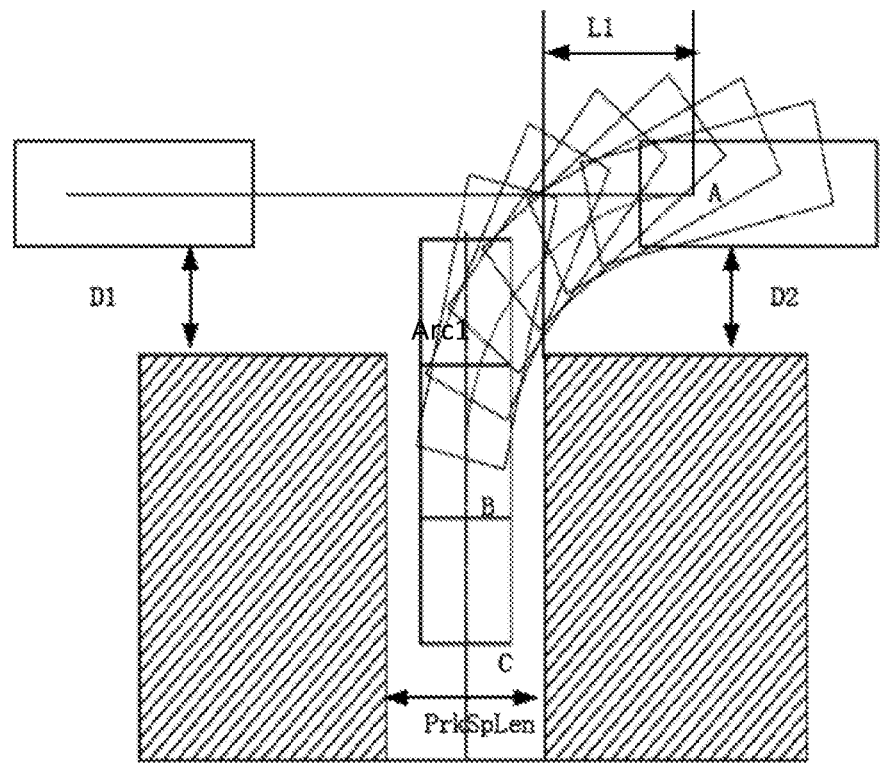
FIG. 7 is a schematic diagram of one parking path aiming at the vertical parking space.

By taking parking in a vertical parking space for example, in consideration of parking time, the parking path illustrated in FIG. 7 is selected preferably, namely the first parking path. The first parking path is: reaching a point A by driving straight or backing, and then turning the steering wheel to right to get a minimum turning radius $R_{Min}$, and then driving back for a quarter of arc Arc1, and then straightening the steering wheel after reaching a point B, and then backing from the point B to a point C to enter in the middle of the parking space.

Figure 8:
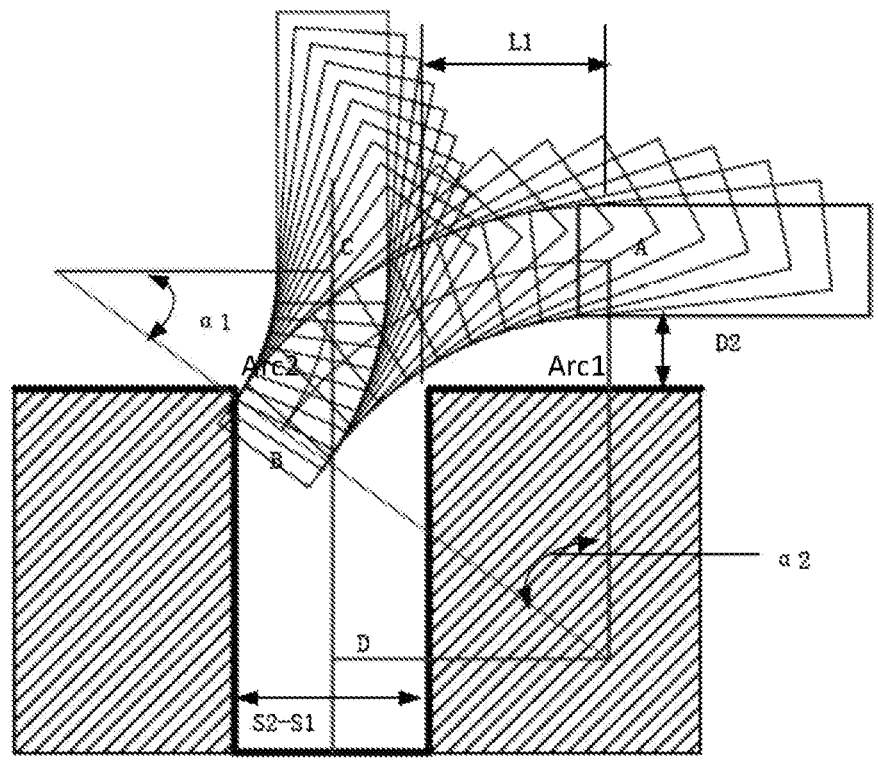
FIG. 8 is a schematic diagram of another parking path aiming at the vertical parking space.

Based on the simplified model of Ackermann steering geometry, taking that the vehicle does not collide with the obstacles at two sides of the parking space when entering into the target parking space, and the vehicle is in the middle of the parking space after driving back for the Arc1 (the vehicle is in the middle of the parking space in the direction of parking space width when backing at last) as the constraints, the automatic parking control device 4 may obtain by calculation, according to the lateral distance D2 between the vehicle and the target parking space, a distance L1 between the start point of parking A and the right side of the target parking space, a path length (the length from the point B to the point C) LinB2C when the vehicle backs to enter in the middle of the parking space, and a minimum parking space width PrkSpLen required by the parking path. If the PrkSpLen is smaller than or equal to the parking space width PL, it is determined that the vehicle may park according to the parking path, thereby obtaining the distance L1 between the start point of parking A and the right side of the target parking space and the parking path: a length of the Arc1 Arc1Len being equal to a minimum turning radius $R_{Min}*\pi/2$ of the vehicle, and the length LinB2C from the point B to the point C; a condition of stopping parking is that the vehicle drives to the point C. If the required minimum parking space width PrkSpLen calculated is greater than the parking space width PL, the parking path illustrated in FIG. 8 is selected, namely the second parking path.

The second first parking path is: reaching the point A by driving straight or backing, and then turning the steering wheel to right to get a minimum turning radius $R_{Min}$, and then reaching the point B after driving back for an arc Arc1 (Arc1 is smaller than a quarter of arc) and then turning in place the steering wheel to left to get a minimum turning radius $R_{Min}$, and then turning left and driving forward for an arc Arc2, and then reaching the point C and then straightening the vehicle body, and then straightening in place the steering wheel, and then backing from the point C to a point D to enter in the middle of the parking space.

Based on the simplified model of Ackermann steering geometry, taking that the vehicle does not collide with the obstacles at two sides of the parking space when entering into the target parking space, and the vehicle is in the middle of the parking space after driving back for the Arc2 as the constraints, the automatic parking control device 4 may obtain by calculation, according to the lateral distance D2 between the vehicle and the target parking space and an actual width PL of the target parking space, the distance L1 between the start point of parking A and the right side of the target parking space, angles α1 and α2 corresponding to the arcs Arc1 and Arc2, and the path length (the length from the point C to the point D) LinC2D when the vehicle backs to enter in the middle of the parking space, thereby obtaining the distance L1 between the start point of parking A and the right side of the target parking space and the parking path are obtained, namely the length of the Arc1 Arc1Len being equal to the minimum turning radius $R_{Min}*α1$, the length of the Arc2 Arc2Len being equal to the minimum turning radius $R_{Min}*α2$, and the length LinC2D from the point C to the point D; the condition of stopping parking is that the vehicle drives to the point D.

Figure 9:
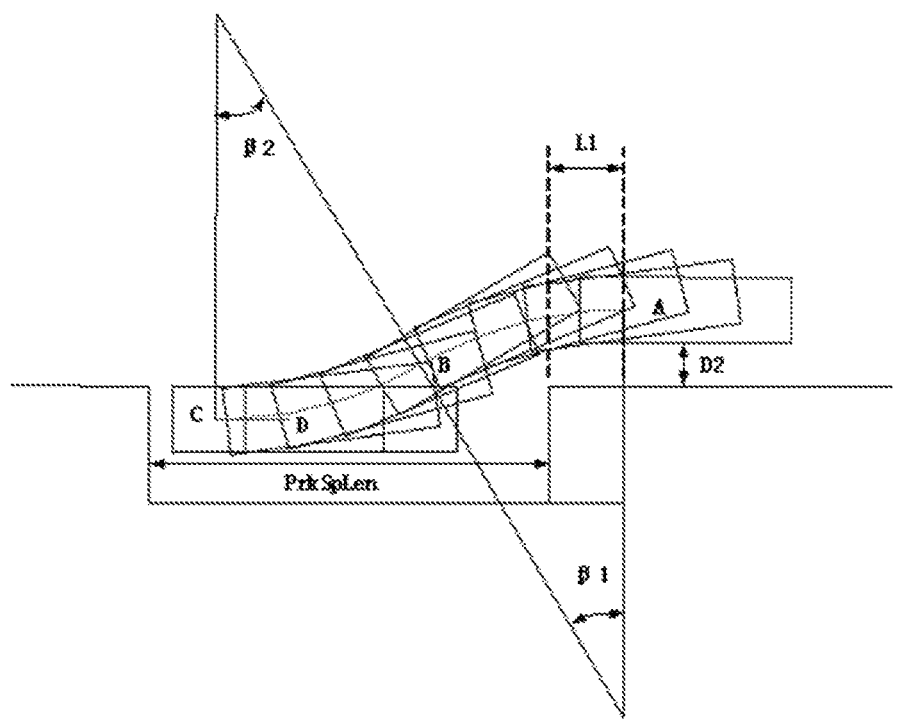
FIG. 9 is a schematic diagram of one parking path aiming at the parallel parking space.

By taking parking in a parallel parking space for example, in consideration of parking time, the parking path illustrated in FIG. 9 is selected preferably, namely the first parking path. The first parking path is: reaching the point A by driving straight or backing, and then turning the steering wheel to left to get a minimum turning radius $R_{Min}$, and then driving back for an AB arc, and then turning the steering wheel to left to get a minimum turning radius $R_{Min}$ after reaching the point B, and then driving back for a BC arc, and then driving straight from the point C to the point D to enter in the middle of the parking space.

Figure 10:
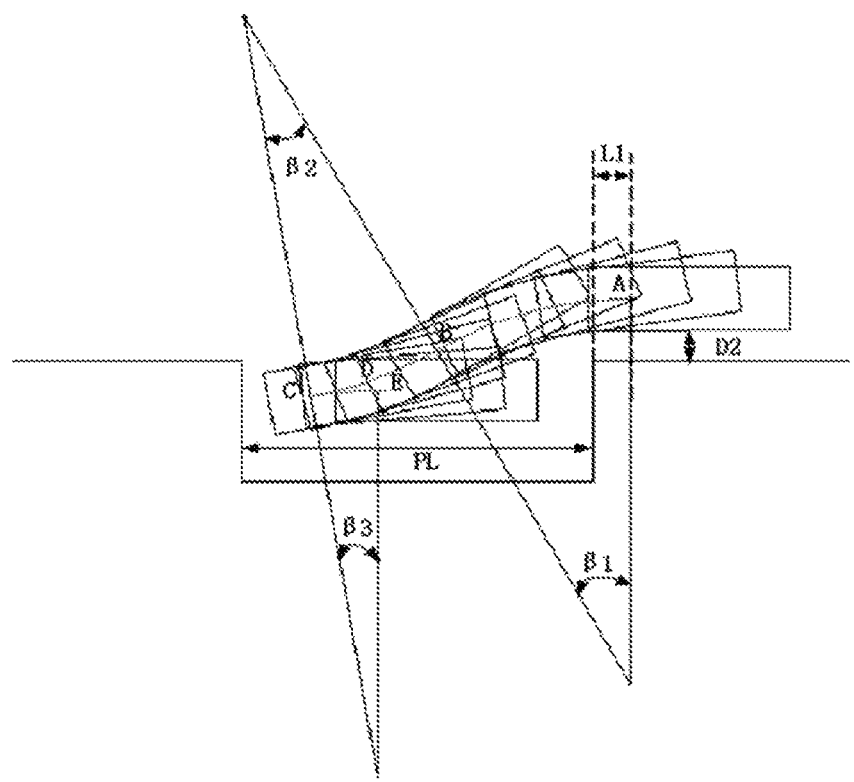
FIG. 10 is a schematic diagram of another parking path aiming at the parallel parking space.

Based on the simplified model of Ackermann steering geometry, taking that the vehicle does not collide with the obstacles at two sides of the parking space when entering into the target parking space, and an outer edge of the vehicle aligns with an outer edge of the parking space after the vehicle drives back for the AB arc Arc1 and the BC arc Arc2 as the constraints, the automatic parking control device 4 may obtain by calculation, according to the lateral distance D2 between the vehicle and the target parking space, the distance L1 between the start point of parking A and the right side of the target parking space, an angle β1 corresponding to the AB arc, an angle β2 corresponding to the BC arc, and the minimum parking space width PrkSpLen required by the parking path. If PrkSpLen is smaller than or equal to the parking space width PL, it is determined that the vehicle may park according to the parking path, thereby obtaining the distance L1 between the start point of parking A and the right side of the target parking space and the parking path, namely a length of the AB arc Arc1Len being equal to the minimum turning radius $R_{Min}*β1$ of the vehicle, the length of the BC arc Arc2Len being equal to the minimum turning radius $R_{Min}*β2$ of the vehicle, and the length from the point C to the point D LinC2D; the condition of stopping parking is that the vehicle drives to the point D. If the required minimum parking space width PrkSpLen calculated above is greater than the parking space width PL, the parking path illustrated in FIG. 10 is selected, namely the second parking path.

The second parking path is: reaching the point A by driving straight or backing, and then turning the steering wheel to left to get a minimum turning radius $R_{Min}$, and then driving back for the AB arc, and then turning the steering wheel to left to get a minimum turning radius $R_{Min}$ after reaching the point B, and then driving back for the BC arc, and then turning the steering wheel to left to get a minimum turning radius $R_{Min}$ after reaching the point C, and then driving forward for a CD arc, and then driving straight from the point D to the point E to enter in the middle of the parking space.

Based on the simplified model of Ackermann steering geometry, taking that the vehicle does not collide with the obstacles at two sides of the parking space when entering into the target parking space, and the outer edge of the vehicle aligns with the outer edge of the parking space after the vehicle drives back for the AB arc Arc1, the BC arc Arc2 and the CD arc Arc3 as the constraints, the automatic parking control device 4 may obtain by calculation, according to the lateral distance D2 between the vehicle and the target parking space and the actual width PL of the target parking space, the distance L1 between the start point of parking A and the right side of the target parking space, angles β1, β2 and β3 corresponding to the AB arc, the BC arc and the CD arc, and the path length (the length from the point D to the point E) LinD2E when the vehicle moves straight to enter in the middle of the parking space, thereby obtaining the distance L1 between the start point of parking A and the right side of the target parking space and the parking path are obtained, namely the length of the AB arc Arc1Len being equal to the minimum turning radius $R_{Min}*β1$, the length of the BC arc Arc2Len is equal to the minimum turning radius $R_{Min}*β2$, the length of the CD arc Arc3Len is equal to the minimum turning radius $R_{Min}*β3$, and the length LinD2E from the point D to the point E; the condition of stopping parking is that the vehicle drives to the point E.

Figure 11:
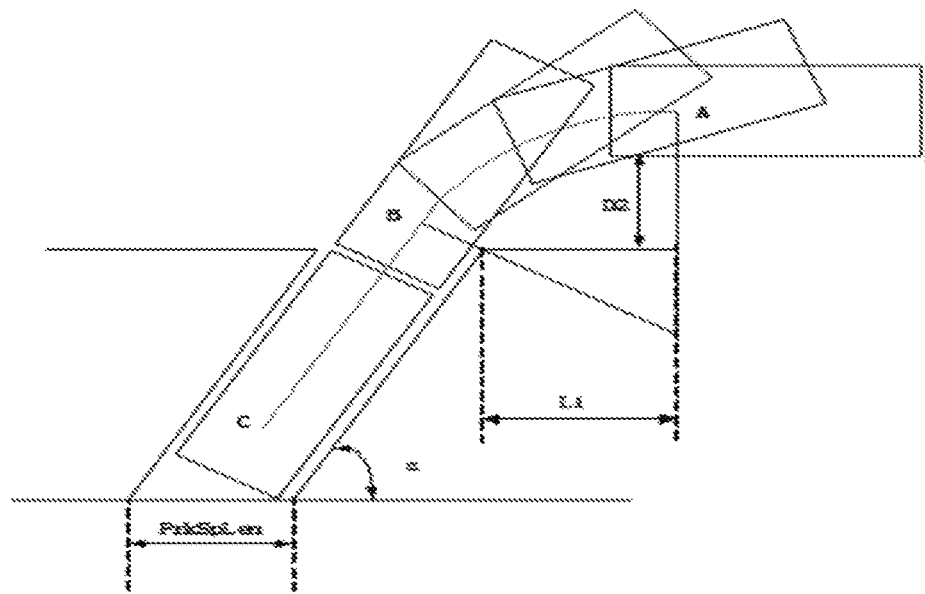
FIG. 11 is a schematic diagram of one parking path aiming at the diagonal parking space.

By taking parking in a diagonal parking space for example, in consideration of parking time, the parking path illustrated in FIG. 11 is selected preferably, namely the first parking path. The first parking path is: driving straight or backing to reach the point A, and then turning the steering wheel to right to get a minimum turning radius $R_{Min}$, and then driving back for the AB arc Arc1, and then straightening in place the steering wheel after reaching the point B, and then driving back from the point B to the point C to enter in the middle of the parking space.

Figure 12:
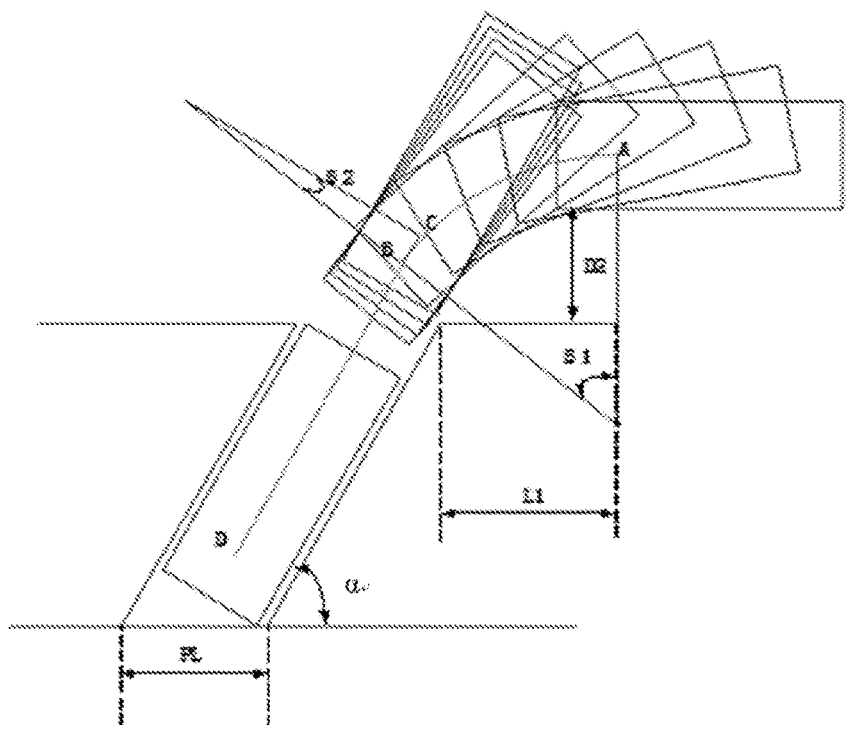
FIG. 12 is a schematic diagram of another parking path aiming at the diagonal parking space.

Based on the simplified model of Ackermann steering geometry, taking that the vehicle does not collide with the obstacles at two sides of the parking space when entering into the target parking space, and the vehicle is in the middle of the parking space after moving back for the Arc1 (the vehicle is in the middle of the parking space in the direction of parking space width when backing at last) as the constraints, the automatic parking control device 4 may obtain by calculation, according to the lateral distance D2 between the vehicle and the target parking space, the distance L1 between the start point of parking A and the right side of the target parking space, the path length (the length from the point B to the point C) LinB2C when the vehicle moves back to enter in the middle of the parking space, and the minimum parking space width PrkSpLen required by the parking path. If the PrkSpLen is smaller than or equal to the parking space width PL, it is determined that the vehicle may park according to the parking path, thereby obtaining the distance L1 between the start point of parking A and the right side of the target parking space and the parking path, namely the length of the Arc1Len being equal to the minimum turning radius $R_{Min}*\alpha$ ($\alpha$ is the angle of inclination of parking space) of the vehicle, and the length LinB2C from the point B to the point C; the condition of stopping parking is that the vehicle drives to the point C. If the required minimum parking space width PrkSpLen calculated is greater than the parking space width PL, the parking path illustrated in FIG. 12 is selected, namely the second parking path.

The second parking path is: driving straight or backing to reach the point A, and then turning the steering wheel to right to get a minimum turning radius $R_{Min}$, and then driving back for an arc Arc1 (Arc1 is smaller than a quarter of arc) to reach the point B, and then turning in place the steering wheel to right to get a minimum turning radius $R_{Min}$, and then turning left and moving forward for an arc Arc2, and then straightening the vehicle body after reaching the point C, and then straightening the steering wheel, and then backing the vehicle from the point C to the point D to enter in the middle of the parking space.

Based on the simplified model of Ackermann steering geometry, taking that the vehicle does not collide with the obstacles at two sides of the parking space when entering into the target parking space, a rear axle center of the vehicle is on the center line of the parking space after the vehicle moves back for the AB arc Arc1 and the BC arc Arc2, and a sum of the angles β1 and β2 corresponding to the arc Arc1 and the arc Arc2 is a (a is the angle of inclination of parking space) as the constraints, the automatic parking control device 4 may obtain by calculation, according to the lateral distance D2 between the vehicle and the target parking space and the actual width PL of the target parking space, the distance L1 between the start point of parking A and the right side of the target parking space, the angles β1 and β2 corresponding to the Arc1 and the Arc2, and the path length (the length from the point C to the point D) LinC2D when the vehicle moves back to enter in the middle of the parking space, thereby obtaining the distance L1 between the start point of parking A and the right side of the target parking space and the parking path, namely the length of the Arc1 Arc1Len being equal to the minimum turning radius $R_{Min}*\beta 1$, the length of the Arc2 Arc2Len being equal to the minimum turning radius $R_{Min}*\beta 2$, and the length LinC2D from the point C to the point D; the condition of stopping parking is that the vehicle moves to the point D.

It can be seen from above that the full-automatic parking method provided by the embodiments of the present disclosure may cover three types of parking space, namely the vertical parking space, the parallel parking space, and the diagonal parking space, and may select, aiming at each type of parking space, the first parking path or the second parking path to park according to the different dimensions of the target parking spaces.

After the start point of parking A and the parking path are obtained by calculation, at S40, the automatic parking control device 4 controls the speed control device 5, the gear control device 6, and the steering wheel control device 7, so as to control the vehicle to automatically park (move forward or back) to the start point of parking A.

At S50, the automatic parking control device 4 controls the speed control device 5, the gear control device 6, and the steering wheel control device 7, so as to control the vehicle to automatically park according to the planned parking path and park the vehicle in the parking space. Specifically, in the process of controlling the vehicle to automatically park in the parking space, the distance between the current vehicle and obstacles around is calculated in real time according to the distance-measurement information of the ultrasonic sensors Rd1-Rd12, and the parking path is adjusted in real time according to the distance-measurement information. The control flow is illustrated in FIG. 13.

Because the parking path obtained by calculation at S30 includes multiple parking sub-paths (for example, the parking path illustrated in FIG. 7 includes the parking sub-paths, namely the AB arc and the straight line BC, and the parking path illustrated in FIG. 8 includes the parking sub-paths, namely the AB arc, the BC arc, and the straight line CD), the whole parking path is composed of the parking sub-paths. Each parking sub-path has the corresponding length of parking path that it needs to execute and the corresponding steering wheel angle. The whole parking path control includes the control over multiple parking sub-paths having a chronological order. FIG. 13 illustrates a control flow of any parking sub-path, in which the distance-measurement information of the ultrasonic sensor is acquired through the sensing device 3, the information about the current vehicle and the vehicles around is obtained by calculation, and the parking sub-path is adjusted in real time.

Figure 13:
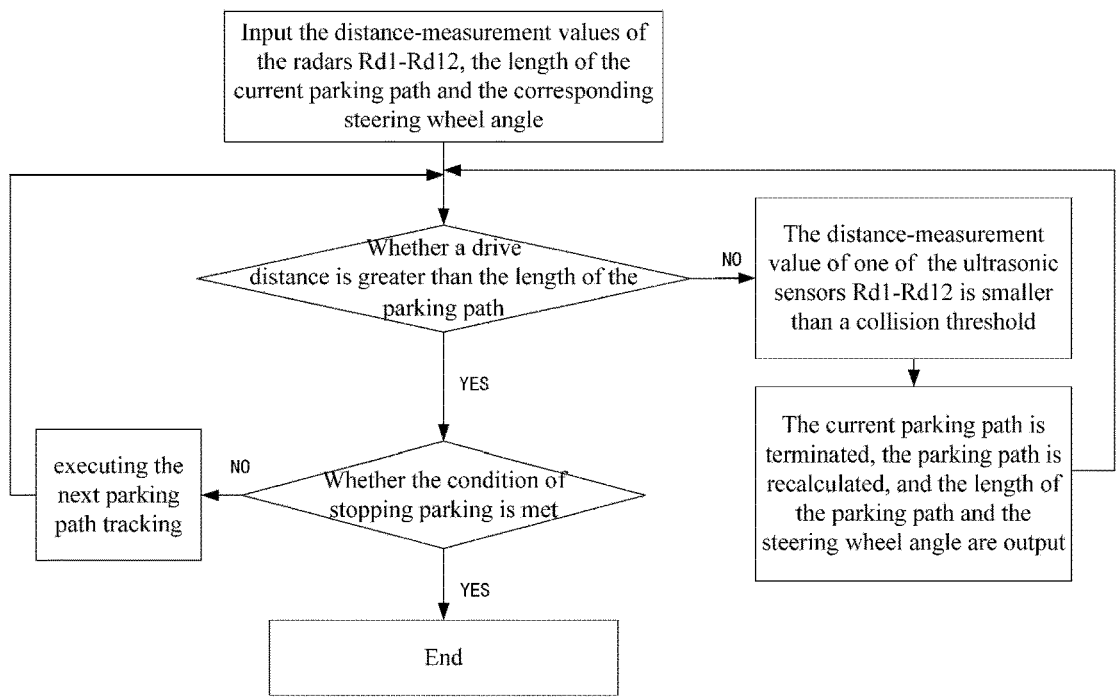
FIG. 13 is a control flow chart of each parking sub-path stage.

As illustrated in FIG. 13, the specific parking control process aiming at each parking sub-path includes the following steps.

At S51, the vehicle is controlled to park according to the length of the parking path that the current parking sub-path needs to execute and the corresponding steering wheel angle, and the distance-measurement value collected by the sensing device is input to the automatic parking control device 4.

At S52, the automatic parking control device 4 determines whether the distance of the vehicle is greater than or equal to the length of the parking path that the current parking sub-path needs to execute; if not, the process proceeds to S53; if so, the process proceeds to S55.

At S53, the automatic parking control device 4 determines a relationship between the distance-measurement value collected by the sensors Rd1-Rd12 and a preset collision threshold; if all the distance-measurement values collected by the sensors Rd1-Rd12 are greater than or equal to the collision threshold, the control over the parking sub-path is continued; if one of the distance-measurement values collected by the ultrasonic sensors Rd1-Rd12 is smaller than the collision threshold, the process proceeds to S54.

At S54, the control over the current parking sub-path is terminated, the parking sub-path is recalculated to obtain an updated length of the parking sub-path and steering wheel angle, and the process returns to S51.

At S55, it is determined whether the condition of stopping the parking is met; if so, the parking is completed, and the vehicle disabling device 8 is used to close the window, turn off the light, turn off the engine and lock the vehicle; if not, the process proceeds to S56.

At S56, a parking control over the current parking sub-path is completed, and the parking control over the next parking sub-path is started until the condition of stopping the parking is met, and the vehicle is parked in the parking space.

The vehicle disabling device 8 may be a window motor, a light switch, a flameout control switch, and so on. A control signal of the vehicle disabling device 8 may be automatically sent by the automatic parking control device 4 after the parking is completed, or sent, by the user, to the wireless signal receiving device in the vehicle through the remote key and the user terminal, and then transmitted to the vehicle disabling device 8 by the wireless signal receiving device.

To sum up, through the full-automatic parking method and system provided by the embodiments of the present disclosure, after the automatic parking system is activated, the vehicle searches and identifies a free parking space while automatically moving forward, and automatically parks in the parking space after finding the free parking space; no human involvement is required in the whole process of searching a parking space and parking, thereby implementing full-automatic parking. In this way, the driver may get off before the vehicle parks in the parking space, which avoids the situation where the driver cannot open the door to get off when driving the vehicle to park in the narrow vertical or diagonal parking space, thereby improving user experience.

The above is only the preferred embodiments of the present disclosure and not intended to limit the form of the present disclosure. Although the present disclosure has been disclosed above through the preferred embodiments, the preferred embodiments are not intended to limit the present disclosure. Any skilled familiar with the field may utilize the above disclosed technical content to make a few changes or modifications which are equivalent embodiments of the same change. As long as not departing from the content of the technical solutions of the present disclosure, any simple alternation, equivalent change and modification made to the above embodiments according to the technical essence of the present disclosure shall fall within the scope of the technical solutions of the present disclosure.

What is claimed is:

1. A full-automatic parking method, comprising:
   receiving a start instruction sent by a user, and activating an automatic parking system according to the start instruction;
   controlling a vehicle to automatically move forward and search, during moving, whether there is an available parking space at the left sides or the right side of the vehicle, and when there is an available parking space, identifying basic information of a target parking space;
   planning a parking path according to the identified basic information of the target parking space, and obtaining a start point of parking and a parking path from the start point of parking to an end point of parking;
   controlling the vehicle to automatically move to the start point of parking; and
   controlling the vehicle to automatically park in the parking space according to the planned parking path;
   wherein after activating the automatic parking system, and before controlling the vehicle to automatically move forward to search a parking space, further comprising:
   detecting whether a driver of the vehicle has got off; if it is detected that the driver has not got off, controlling the vehicle to be in a stationary state and wait for or prompt the driver to get off.

2. The full-automatic parking method as claimed in claim 1, wherein receiving the start instruction sent by the user, and activating the automatic parking system according to the start instruction comprises:
   detecting whether an automatic parking button set in the vehicle is triggered by the user; and
   when it is detected that the automatic parking button is triggered by the user, activating the automatic parking system.

3. The full-automatic parking method as claimed in claim 1, wherein receiving the start instruction sent by the user, and activating the automatic parking system according to the start instruction comprises:
   detecting whether an automatic parking start instruction, which is sent by the user via a remote key or a user terminal, is received by a wireless signal receiving device set in the vehicle; and
   when it is detected that the automatic parking start instruction, which is sent by the user, is received by the wireless signal receiving device, activating the automatic parking system.

4. The full-automatic parking method as claimed in claim 1,
   wherein after activating the automatic parking system, and before controlling the vehicle to automatically move forward to search a parking space, further comprising:
   detecting whether a driver of the vehicle has got off;
   if it is detected that the driver has got off, controlling the vehicle to move forward to search a parking space.

5. The full-automatic parking method as claimed in claim 1, wherein after activating the automatic parking system, and before controlling the vehicle to automatically park according to the planned parking path, further comprising:
   detecting whether a driver of the vehicle has got off;
   if it is detected that the driver has not got off, controlling the vehicle to be in the stationary state and wait for or prompt the driver to get off;
   if it is detected that the driver has got off, controlling the vehicle to automatically park according to the planned parking path.

6. The full-automatic parking method as claimed in claim 1, wherein controlling the vehicle to automatically move forward and search, during moving, whether there is an available parking space at the left sides or the right side of the vehicle comprises:
   controlling the vehicle to automatically move forward at a given speed;
   during the moving, acquiring distance-measurement information of a plurality of ultrasonic sensors about the vehicle and surroundings by using a sensing device set on the vehicle body, and adjusting, according to the distance-measurement information, a moving speed and a steering wheel angle of the vehicle to make the vehicle search the parking space and avoid obstacles in a moving direction until it is determined according to the distance-measurement information that there is an available parking space at the left side or the right side of the vehicle, acquiring the basic information of the target parking space according to the distance-measurement information.

7. The full-automatic parking method as claimed in claim 6, wherein when the vehicle searches the parking space in the moving direction, determining, according to the distance-measurement information of the ultrasonic sensors at the left side or the right side of the vehicle, whether the vehicle deviates from the moving direction; if it is determined that the vehicle has deviates from the moving direction, adjusting a moving orientation of the vehicle until the vehicle returns to the correct moving direction.

8. The full-automatic parking method as claimed in claim 6, wherein when the vehicle searches the parking space in the moving direction, if it is determined according to the distance-measurement information that there is an obstacle in front of the vehicle, controlling the vehicle to brake, and after the obstacle disappears, controlling the vehicle to move forward again to search the parking space; if the obstacle is still there after a predetermined length of time, controlling the vehicle to exit the automatic parking system.

9. The full-automatic parking method as claimed in claim 1, when the vehicle searches the parking space in the moving direction, determining whether there is an available parking space at the left sides or the right side of the vehicle in the following way:

determining whether the vehicle passes by a vehicle/other obstacle according to a range of distance-measurement values between the vehicle and a parked vehicle or other obstacles and a fluctuation in distance-measurement values before and after this moment; when the vehicle is about to leave this vehicle/other obstacle, recording, after a step change in the distance-measurement value of the vehicle, a drive distance S1 of the vehicle as a first boundary of the parking space, and recording a minimum distance-measurement value D1 during the time when the vehicle passes by this vehicle/other obstacle as a lateral distance between the vehicle and the first vehicle/other obstacle; wherein the minimum distance-measurement value D1, corresponding to the drive distance of the vehicle, is recorded as S1';

when the vehicle passes by a vehicle/other obstacle again, recording, after another step change in the distance-measurement value of the vehicle, a drive distance S2 of the vehicle as a second boundary of the parking space, recording a minimum distance-measurement value D2 during the time when the vehicle passes by the second vehicle/other obstacle as the lateral distance between the vehicle and the second vehicle/other obstacle, and recording a minimum distance-measurement value during the first step change and the second step change as a parking space depth D3;

determining a change trend of the distance-measurement value when the vehicle passes by the first vehicle/obstacle and the second vehicle/obstacle, fitting the distance-measurement value into a straight line changing over time, and calculating the slope of the straight line to obtain an angle of inclination $\alpha$ between the moving direction and the parked vehicle/obstacles;

if $\alpha \geq 15°$, and $D3 \geq L*\sin \alpha + D2 + 1$ m, and $$\left(S2 - S1 - \frac{S1 - S1'}{(\tan\alpha)^2}\right) * \sin\alpha \geq W + 1 \text{ m},$$

where the L is the length of the vehicle and the W is the width of the vehicle, then determining that the target parking space is a diagonal parking space, a parking space width $$PL = \left(S2 - S1 - \frac{S1 - S1'}{(\tan\alpha)^2}\right),$$

the lateral distance is D2, and the angle of inclination of the parking space is u;

if $\alpha \leq 15°$, $D3 \geq W + D2$, and $S2 - S1 \geq L + 1.2$ m, determining that the target parking space is a parallel parking space available for parking, the parking space width PL=S2−S1, and the lateral distance is D2;

if $\alpha \leq 15°$, $D3 \geq L + D2$, and $S2 - S1 \geq W + 1$ m, determining that the target parking space is a vertical parking space available for parking, the parking space width PL=S2−S1, and the lateral distance is D2;

if none of the above conditions is met, determining that the target parking space is not available for parking, and continuing to search forward for a parking space.

10. The full-automatic parking method as claimed in claim 9, wherein if the identified target parking space is the vertical parking space, planning the parking path according to the basic information of the identified target parking space, and obtaining the start point of parking and the parking path from the start point of parking to the end point of parking, comprising:

preliminarily planning a first parking path: reaching a point A by driving straight or backing, and then turning the steering wheel to right to get a minimum turning radius $R_{Min}$, and then driving back for a quarter of arc Arc1, and then straightening the steering wheel after reaching a point B, and then backing from the point B to a point C to enter in the middle of the parking space; according to the lateral distance D2 between the vehicle and the target parking space, and taking that the vehicle does not collide with the obstacles at two sides of the parking space when entering into the target parking space, and the vehicle is in the middle of the parking space after driving back for the Arc1 as the constraints, obtaining by calculation a distance L1 between the start point of parking A and the right side of the target parking space, a path length LinB2C from the point B to the point C when the vehicle backs to enter in the middle of the parking space, and a minimum parking space width PrkSpLen required by the parking path; if the PrkSpLen is smaller than or equal to the parking space width PL, determining that the vehicle may park according to the parking path, thereby obtaining the distance L1 between the start point of parking A and the right side of the target parking space and the parking path: a length of the Arc1 Arc1Len being equal to a minimum turning radius $R_{Min}*\pi/2$ of the vehicle, and the length LinB2C from the point B to the point C; a condition of stopping parking is that the vehicle drives to the point C;

if the required minimum parking space width PrkSpLen calculated above is greater than the parking space width PL, selecting a second parking path: reaching the point A by driving straight or backing, and then turning the steering wheel to right to get a minimum turning radius $R_{Min}$, and then reaching the point B after driving back for an arc Arc1, and then turning in place the steering wheel all the way to the left, and then turning left and driving forward for an arc Arc2, and then reaching the point C and then straightening the vehicle body, and then straightening in place the steering wheel, and then backing from the point C to a point D to enter in the middle of the parking space;

according to the lateral distance D2 between the vehicle and the target parking space and an actual width PL of the target parking space, and taking that the vehicle does not collide with the obstacles at two sides of the parking space when entering into the target parking space, and the vehicle is in the middle of the parking space after driving back for the Arc2 as the constraints, obtaining by calculation the distance L1 between the start point of parking A and the right side of the target parking space, angles $\alpha 1$ and $\alpha 2$ corresponding to the arcs Arc1 and Arc2, and the path length LinC2D from the point C to the point D when the vehicle backs to enter in the middle of the parking space;

obtaining the distance L1 between the start point of parking A and the right side of the target parking space and the parking path: the length of the Arc1 Arc1Len is equal to the minimum turning radius $R_{Min}*\alpha1$, the length of the Arc2 Arc2Len is equal to the minimum turning radius $R_{Min}*\alpha2$ and the length LinC2D from the point C to the point D, and the condition of stopping parking is that the vehicle drives to the point D.

11. The full-automatic parking method as claimed in claim 9, wherein if the identified target parking space is the parallel parking space, planning the parking path according to the basic information of the identified target parking space, and obtaining the start point of parking and the parking path from the start point of parking to the end point of parking, comprising:

preliminarily planning the first parking path: reaching the point A by driving straight or backing, and then turning the steering wheel to right to get a minimum turning radius $R_{Min}$, and then driving back for an AB arc, and then turning the steering wheel all the way to the left after reaching the point B, and then driving back for a BC arc, and then driving straight from the point C to the point D to enter in the middle of the parking space; according to the lateral distance D2 between the vehicle and the target parking space, and taking that the vehicle does not collide with the obstacles at two sides of the parking space when entering into the target parking space, and an outer edge of the vehicle aligns with an outer edge of the parking space after the vehicle drives back for the AB arc Arc1 and the BC arc Arc2 as the constraints, obtaining by calculation the distance L1 between the start point of parking A and the right side of the target parking space, an angle $\beta1$ corresponding to the AB arc, an angle $\beta2$ corresponding to the BC arc, and the minimum parking space width PrkSpLen required by the parking path; if the PrkSpLen is smaller than or equal to the parking space width PL, determining that the vehicle may park according to the parking path, thereby obtaining the distance L1 between the start point of parking A and the right side of the target parking space and the parking path: a length of the AB arc Arc1Len being equal to the minimum turning radius $R_{Min}*\beta1$ of the vehicle, the length of the BC arc Arc2Len being equal to the minimum turning radius $R_{Min}*\beta2$ of the vehicle, and the length from the point C to the point D LinC2D; the condition of stopping parking is that the vehicle drives to the point D;

if the required minimum parking space width PrkSpLen calculated above is greater than the parking space width PL, selecting the second parking path: reaching the point A by driving straight or backing, and then turning the steering wheel to right to get a minimum turning radius $R_{Min}$, and then driving back for the AB arc, and then turning the steering wheel all the way to the left after reaching the point B, and then driving back for the BC arc, and then turning the steering wheel to right to get a minimum turning radius $R_{Min}$, after reaching the point C, and then driving forward for a CD arc, and then driving straight from the point D to the point E to enter in the middle of the parking space; according to the lateral distance D2 between the vehicle and the target parking space and the actual width PL of the target parking space, and taking that the vehicle does not collide with the obstacles at two sides of the parking space when entering into the target parking space, and the outer edge of the vehicle aligns with the outer edge of the parking space after the vehicle drives back for the AB arc Arc1, the BC arc Arc2 and the CD arc Arc3 as the constraints, obtaining by calculation the distance L1 between the start point of parking A and the right side of the target parking space, angles $\beta1$, $\beta2$ and $\beta3$ corresponding to the AB arc, the BC arc and the CD arc, and the path length LinD2E from the point D to the point E when the vehicle moves straight to enter in the middle of the parking space; obtaining the distance L1 between the start point of parking A and the right side of the target parking space and the parking path: the length of the AB arc Arc1Len is equal to the minimum turning radius $R_{Min}*\beta1$, the length of the BC arc Arc2Len is equal to the minimum turning radius $R_{Min}*\beta2$, the length of the CD arc Arc3Len is equal to the minimum turning radius $R_{Min}*\beta3$, and the length LinD2E from the point D to the point E; the condition of stopping parking is that the vehicle drives to the point E.

12. The full-automatic parking method as claimed in claim 9, wherein if the identified target parking space is the diagonal parking space, planning the parking path according to the basic information of the identified target parking space, and obtaining the start point of parking and the parking path from the start point of parking to the end point of parking, comprising:

preliminarily planning the first parking path: driving straight or backing to reach the point A, and then turning the steering wheel to right to get a minimum turning radius $R_{Min}$, and then driving back for the AB arc Arc1, and then straightening in place the steering wheel after reaching the point B, and then driving back from the point B to the point C to enter in the middle of the parking space; according to the lateral distance D2 between the vehicle and the target parking space, and taking that the vehicle does not collide with the obstacles at two sides of the parking space when entering into the target parking space, and the vehicle is in the middle of the parking space after moving back for the Arc1 as the constraints, obtaining by calculation the distance L1 between the start point of parking A and the right side of the target parking space, the path length LinB2C from the point B to the point C when the vehicle moves back to enter in the middle of the parking space, and the minimum parking space width PrkSpLen required by the parking path; if the PrkSpLen is smaller than or equal to the parking space width PL, determining that the vehicle may park according to the parking path, thereby obtaining the distance L1 between the start point of parking A and the right side of the target parking space and the parking path: the length of the Arc1Len being equal to the minimum turning radius $R_{Min}*\alpha$ of the vehicle, and the length from the point B to the point C LinB2C; the condition of stopping parking is that the vehicle moves to the point C;

if the required minimum parking space width PrkSpLen calculated above is greater than the parking space width PL, selecting the second parking path: driving straight or backing to reach the point A, and then turning the steering wheel to right to get a minimum turning radius RN, and then driving back for an arc Arc1 to reach the point B, and then turning in place the steering wheel all the way to the left, and then turning left and moving forward for an arc Arc2, and then straightening the vehicle body after reaching the point C, and then straightening in place the steering wheel, and then backing the vehicle from the point C to the point D to enter in the middle of the parking space; according to the lateral distance D2 between the vehicle and the target parking space and the actual width PL of the target parking space, and taking that the vehicle does not collide with the obstacles at two sides of the parking space when entering into the target parking space, a rear axle center of the vehicle is on the center line of the parking space after the vehicle moves back for the AB arc Arc1 and the BC arc Arc2, and a sum of the angles β1 and β2 corresponding to the arc Arc1 and the arc Arc2 is a as the constraints, obtaining by calculation the distance L1 between the start point of parking A and the right side of the target parking space, the angles β1 and β2 corresponding to the Arc1 and the Arc2, and the path length LinC2D from the point C to the point D when the vehicle moves back to enter in the middle of the parking space;

obtaining the distance L1 between the start point of parking A and the right side of the target parking space and the parking path: the length of the Arc1 Arc1Len being equal to the minimum turning radius $R_{Min}*β1$, the length of the Arc2 Arc2Len being equal to the minimum turning radius $R_{Min}*β2$, and the length LinC2D from the point C to the point D;

the condition of stopping parking is that the vehicle moves to the point D.

13. The full-automatic parking method as claimed in claim 1, wherein the planned parking path comprises multiple parking sub-paths; executing any one of the multiple parking sub-paths comprises the following steps:

S51, controlling the vehicle to park according to the length of the parking path that the current parking sub-path needs to execute and the corresponding steering wheel angle, and inputting the distance-measurement value collected by the sensing device to an automatic parking control device;

S52, determining whether the distance of the vehicle is greater than or equal to the length of the parking path that the current parking sub-path needs to execute; if not, proceeding to S53; if so, proceeding to S55;

S53, determining a relationship between the distance-measurement value collected by the sensing device and a preset collision threshold; if all the distance-measurement values collected by the sensing device are greater than or equal to the collision threshold, continuing to control the parking sub-path; if one of the distance-measurement values collected by the sensing device is smaller than the collision threshold, proceeding to S54;

S54, ending the control over the current parking sub-path, recalculating the parking sub-path to obtain an updated length of the parking sub-path and steering wheel angle, and returning to S51;

S55, determining whether the condition of stopping the parking is met; if so, completing the parking; if no, proceeding to S56; and S56, completing a parking control over the current parking sub-path, and starting the parking control over the next parking sub-path until the condition of stopping the parking is met, and the vehicle is parked in the parking space.

14. A full-automatic parking system, which is configured to perform a full-automatic parking method as claimed in claim 1, comprising: an automatic parking system starting device, a device for detecting whether a driver has got off, a sensing device, an automatic parking control device, a speed control device, a gear control device, a steering wheel control device, and a vehicle disabling device; any one of the automatic parking system starting device, the device for detecting whether a driver has got off, the sensing device, the speed control device, the gear control device, the steering wheel control device, and the vehicle disabling device is connected with the automatic parking control device.

15. A full-automatic parking system, which is configured to perform a full-automatic parking method as claimed in claim 2, comprising: an automatic parking system starting device, a device for detecting whether a driver has got off, a sensing device, an automatic parking control device, a speed control device, a gear control device, a steering wheel control device, and a vehicle disabling device; any one of the automatic parking system starting device, the device for detecting whether a driver has got off, the sensing device, the speed control device, the gear control device, the steering wheel control device, and the vehicle disabling device is connected with the automatic parking control device.

16. A full-automatic parking system, which is configured to perform a full-automatic parking method as claimed in claim 3, comprising: an automatic parking system starting device, a device for detecting whether a driver has got off, a sensing device, an automatic parking control device, a speed control device, a gear control device, a steering wheel control device, and a vehicle disabling device; any one of the automatic parking system starting device, the device for detecting whether a driver has got off, the sensing device, the speed control device, the gear control device, the steering wheel control device, and the vehicle disabling device is connected with the automatic parking control device.

17. A full-automatic parking system, which is configured to perform a full-automatic parking method as claimed in claim 4, comprising: an automatic parking system starting device, a device for detecting whether a driver has got off, a sensing device, an automatic parking control device, a speed control device, a gear control device, a steering wheel control device, and a vehicle disabling device; any one of the automatic parking system starting device, the device for detecting whether a driver has got off, the sensing device, the speed control device, the gear control device, the steering wheel control device, and the vehicle disabling device is connected with the automatic parking control device.

18. A full-automatic parking system, which is configured to perform a full-automatic parking method as claimed in claim 5, comprising: an automatic parking system starting device, a device for detecting whether a driver has got off, a sensing device, an automatic parking control device, a speed control device, a gear control device, a steering wheel control device, and a vehicle disabling device; any one of the automatic parking system starting device, the device for detecting whether a driver has got off, the sensing device, the speed control device, the gear control device, the steering wheel control device, and the vehicle disabling device is connected with the automatic parking control device.

19. A full-automatic parking system, which is configured to perform a full-automatic parking method as claimed in claim 6, comprising: an automatic parking system starting device, a device for detecting whether a driver has got off, a sensing device, an automatic parking control device, a speed control device, a gear control device, a steering wheel control device, and a vehicle disabling device; any one of the automatic parking system starting device, the device for detecting whether a driver has got off, the sensing device, the speed control device, the gear control device, the steering wheel control device, and the vehicle disabling device is connected with the automatic parking control device.

20. A full-automatic parking system, which is configured to perform a full-automatic parking method as claimed in claim 7, comprising: an automatic parking system starting device, a device for detecting whether a driver has got off, a sensing device, an automatic parking control device, a speed control device, a gear control device, a steering wheel control device, and a vehicle disabling device; any one of the automatic parking system starting device, the device for detecting whether a driver has got off, the sensing device, the speed control device, the gear control device, the steering wheel control device, and the vehicle disabling device is connected with the automatic parking control device.

* * * * *